July 2, 1940.  O. S. FIELD  2,206,667
DIRECT CURRENT MOTOR
Filed March 30, 1938  6 Sheets-Sheet 1
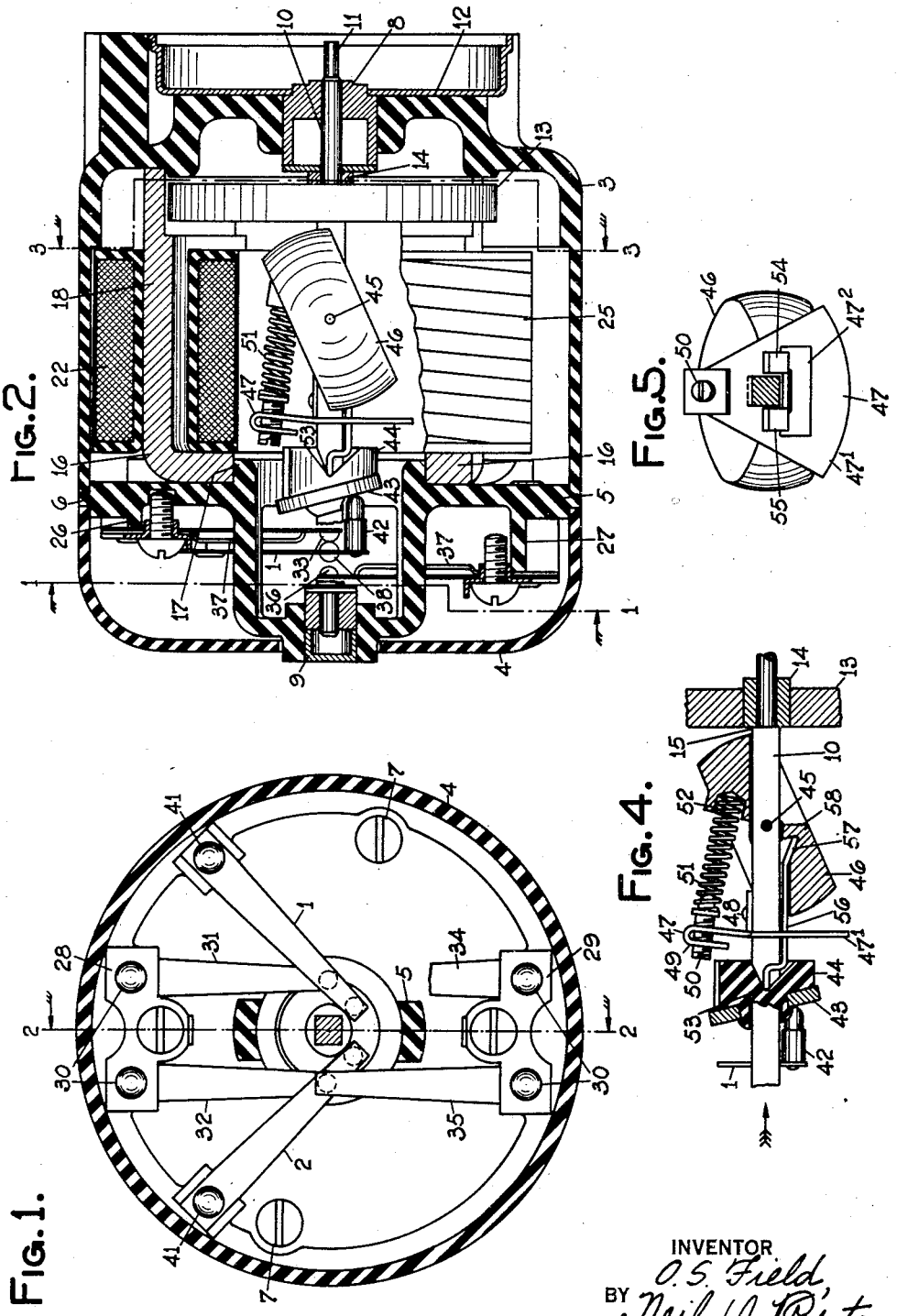
INVENTOR
O. S. Field,
BY Neil W. Preston,
his ATTORNEY July 2, 1940.  O. S. FIELD  2,206,667
DIRECT CURRENT MOTOR
Filed March 30, 1938    6 Sheets-Sheet 2

INVENTOR
O. S. Field,
BY Neil D. Preston,
his ATTORNEY

July 2, 1940.  O. S. FIELD  2,206,667
DIRECT CURRENT MOTOR
Filed March 30, 1938   6 Sheets-Sheet 3

INVENTOR
O. S. Field,
BY Neil W. Preston,
his ATTORNEY

July 2, 1940.   O. S. FIELD   2,206,667
DIRECT CURRENT MOTOR
Filed March 30, 1938   6 Sheets-Sheet 4

INVENTOR
O. S. Field,
BY Neil D. Preston,
his ATTORNEY

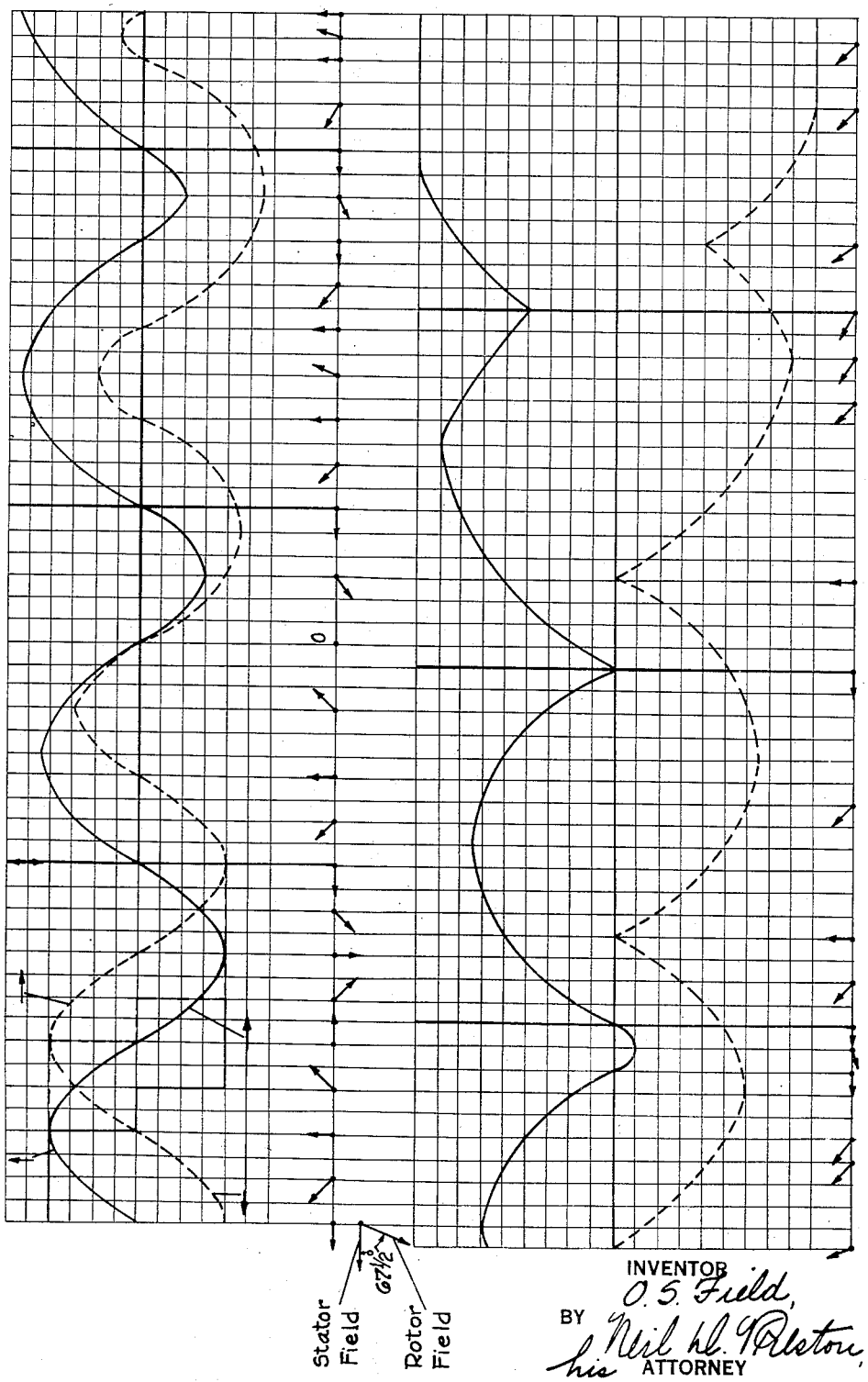

Patented July 2, 1940

2,206,667

UNITED STATES PATENT OFFICE 2,206,667

DIRECT CURRENT MOTOR

Oscar S. Field, Rochester, N. Y., assignor to General Railway Signal Company, Rochester, N. Y.

Application March 30, 1938, Serial No. 198,928

18 Claims. (Cl. 171—222)

This invention relates in general to electric motors, and has more particular reference to a self-starting, reversible, electric motor of the direct current constant speed type.

The motor constituting the subject matter of this invention can be employed in various capacities, but is particularly adapted for use with a time element relay wherein its constant speed characteristics are obviously of great advantage.

In general, and before particularly describing the motor, it can be stated that it comprises a rotor which, preferably, is permanently magnetized, and a stator energized by direct current and so controlled by contacts as to produce a rotating field which produces a drive on the rotor.

The constant speed characteristics are obtained by means of a centrifugal governor which varies its position in accordance with speed to operate the contacts in varying manners, whereby to decrease the drive torque as the speed increases, and vice versa.

In one form of governing means, which has proven very satisfactory in practice, a cam, which is carried by the rotor shaft, and operates the contacts which control the rotating field of the stator, is axially slidable along the shaft, in accordance with speed, to thereby control the field with respect to the rotor, to decrease the drive torque as the speed increases.

In a second form of governor, the cam is pinned to the shaft to prevent it from sliding along, or rotating around, the shaft, but to permit it to rock on the pin which fastens it to the shaft, to thereby vary the inclination of the cam to the rotor shaft, to thus vary the contact operation, and hence the drive torque on the rotor.

In a third form of governing means, the cam which operates the contacts for governing the rotating field of the stator, is restrained from sliding lengthwise on the shaft, and from tilting to vary its angle of inclination with respect to the shaft, but is rotatable about the shaft in accordance with speed, to thereby vary the phase relationship between the stator field and the rotor field, whereby to decrease the drive torque as the speed increases, to thereby produce a governing effect.

Furthermore, the motor is so constructed as to be self-starting and reversible, and still retain the same speed and governing characteristics, regardless of the direction of rotation of the motor.

A further object of this invention is to produce a light, compact motor of simple and rugged construction which can be cheaply manufactured and still will be very dependable and durable in operation.

Further objects, purposes and characteristic features of the invention will appear as the description progresses, reference being made to the accompanying drawings, showing, solely by way of example, in a diagrammatic form, and in no manner whatsoever in a limiting sense, the several forms of invention as referred to above. In the drawings—

Fig. 1 is a sectional view of one form of the motor of this invention, taken on line 1—1 of Fig. 2, viewed in the direction of the arrows.

Fig. 2 is a sectional view on line 2—2 of Fig. 1, viewed in the direction of the arrows.

Fig. 4 is a sectional line view, with parts removed, and parts shown in elevation, of the sliding form of cam governor.

Fig. 5 is an end view of Fig. 4, viewed in the direction of the arrow of Fig. 4, and with parts removed.

Fig. 22 is a diagrammatic representation of the effect of the governing action of the sliding cam, on the motor fields.

Figure 3:
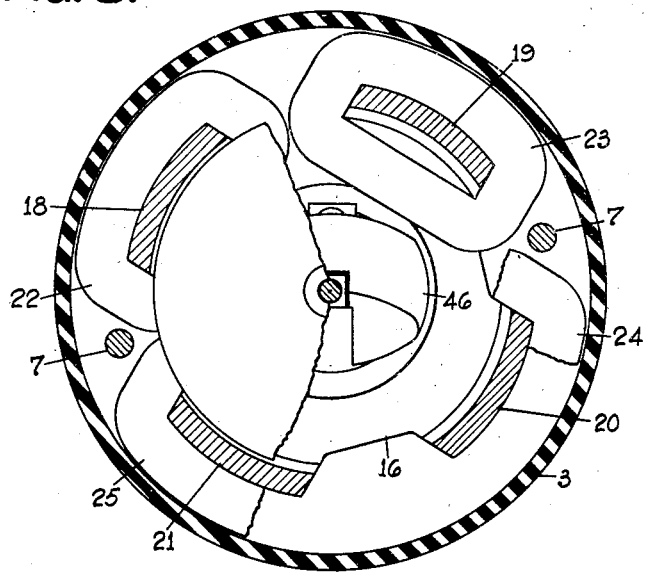
Fig. 3 is a sectional view on line 3—3 of Fig. 2, viewed in the direction of the arrows.

Referring now to the drawings, and first to Fig. 2, the motor is enclosed in a casing formed of insulating material such as Bakelite or other suitable material, and preferably is molded to the desired shape. It comprises a body portion 3, of general cylindrical shape, with a cap portion 4, and an intermediate portion 5, all fitting together, as shown at 6, to constitute a tight enclosure, the portions 3 and 5 being held together by long bolts 7, or the like, which are shown as two in number, the cap portion 4 being held in place by a press fit, or in any other usual or desired manner.

Carried in the casing members 3 and 5, are bearings 8 and 9, of bronze or any other usual or desirable other material, and are molded into place, or pressed therein, as desired. Carried by the bearings, is a shaft 10, having one end 11 projecting beyond the bearing for receiving a gear or the like (not shown), for meshing with reduction gearing or similar means to be contained in the metal housing 12, suitably pressed, or otherwise held in place, as shown in Fig. 2.

Carried on shaft 10, is a rotor 13, which is in the form of a relatively thin disc, of hard magnetic steel, fixed to the shaft by means of a spacer 14, and resting against a shoulder 15 formed where the shaft is turned down to a circular cross-section from a square cross-section, as shown most plainly in Fig. 4. The rotor is preferably permanently magnetized in a given direction, but could be electro-magnetically magnetized, if desired.

The stator, with which the rotor 13 cooperates, comprises a core structure including a continuous ring-like portion 16, receivable on an inwardly projecting boss 17, on the casing part 5, with four upwardly extending, spaced, parallel core legs 18, 19, 20 and 21, terminating in pole shoes closely adjacent the rotor, and enclosing the same. The cores 18—21 are spaced from each other by 90°, and on each core is a winding 22, 23, 24 and 25, arranged when energized to make the pole shoe of its core the same as each of the other cores, either a north pole or a south pole.

Upon the outer face of the casing portion 5, are two projecting bosses 26 and 27, to which are respectively fixed two fixed contact carrying members 28 and 29, by means of rivets or the like, 30, which extend through the bosses and firmly attach the contact carrying members to the casing portion 5. Carried by the contact carrying member 28, which is made of conducting material such as copper, are two fixed back contact fingers 31 and 32, of suitable material such as beryllium copper, having contacts such as 33, of silver or the like. In a like manner, member 29 carries two contact fingers 34 and 35, having contacts such as 36. These contact fingers, such as 31, etc., are furnished with rigid stop members 37, as shown best in Fig. 2, to definitely limit the movement of the finger in one direction.

Cooperating with the fixed back and front contacts, just referred to, are two movable contacts, as 38, carried on movable contact fingers 1 and 2 fastened, as with rivets 41, to bosses on the casing member 5. At the end of each movable contact finger, and beyond its contact point, as, for example, the finger 1 (Fig. 2), is riveted, or otherwise attached, a pusher member 42, which extends inwardly toward the other end of the motor and parallel to the shaft 10. These pushers, as can be seen best in Fig. 1, are positioned at 90° from each other around the shaft 10, and the movable contact fingers are of spring material and have a bias inwardly to cause the pushers to press against the flat face 43, of a cam member 44. This member is, in the form of invention shown in Figs. 1–5, slidable upon the squared shaft 10, and hence, unless otherwise restrained, would be slid inwardly toward the end 11 of the shaft by the force of the bias of the two movable contact fingers pressing their pushers against the cam face 43.

Pivoted to the shaft 10, by means of pin 45, is a centrifugal governor 46 in the form of a disc-like weight (best seen in Figs. 4 and 5), which governor 46, under the influence of centrifugal force, as the shaft 10 turns, tends to move outwardly about its pin 45 as a pivot, to place itself at right angles to the shaft. As viewed in Fig. 4, the governor 46 tends to rotate away from the shaft in a counter clockwise direction. Fastened to the shaft is a bracket 47 which can be riveted or welded or otherwise fastened to the shaft, as at 48, with one end of the bracket bent over on itself, as at 49, and tapped to receive an adjusting screw 50 which receives one end of a biasing spring 51. The other end of this spring is received in a socket 52, near the edge of the governor 46, whereby to bias governor 46 inwardly against shaft 10, in the position shown in Fig. 4, and hold it there until the speed is sufficient to cause it to throw out.

By means of this adjusting screw, the tension on the spring 51 can be adjusted, and thus vary the speed at which the governor begins to operate and thus fix the constant speed of the motor for this particular adjustment. Thus the constant speed motor can be adjusted to operate at various fixed speeds, as will be more clearly apparent as the description progresses.

Sockets 53 are formed in diametrically opposite parts of the inner face of cam 44, to respectively receive the bifurcated ends 54 and 55, of a rigid holding member 56, having a bent end 57 received in a socket 58 in the centrifugal governor 46, the holding member 56 passing through an elongated aperture 47², in the broad end 47¹, of member 47, to thereby guide it and aid in maintaining the member 56 in position.

From the above it can be seen that under the influence of speed of rotation of shaft 10, spring 51, which has a normal trapped tension, is overcome by governor 46, and as the governor throws out from shaft 10, the bifurcated strut 56 is allowed to move toward the gear end of the shaft and permit cam 44 to slide along the shaft under the influence of the pushers 42, to move toward the gear end of the shaft 10 and away from the two fixed front points and the two fixed back points. In this manner, a governing effect on the motor is produced, as will be explained below more fully.

Figure 6:
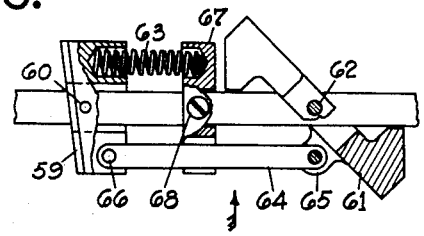
Fig. 6 is a plan view, with parts removed, and with parts broken away, of the tilting form of cam governor.
Figure 7:
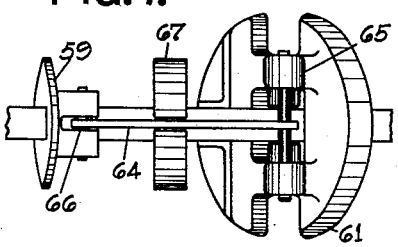
Fig. 7 is a plan view of Fig. 6, viewed in the direction of the arrow of Fig. 6.

Referring now to Figs. 6 and 7, there is here illustrated a different form of governor wherein the cam 59, which operates the movable contacts, is formed of any suitable material, such as stainless steel, or the like. It is pinned to the shaft, as at 60, so as to permit it to tilt, and thus vary its inclination with respect to the shaft, under the influence of a centrifugal governor 61, formed of bronze or the like, and pinned to the shaft as at 62, in a manner to permit it to throw out away from the shaft under the influence of centrifugal force.

A biasing spring 63 is employed to normally position the cam as shown in Fig. 6, with the governor 61 pressed against the shaft by way of a connecting link 64, connected to the governor at 65, and to the cam at 66, and slidable in a slot in an adjustable holding means 67, slidable on the shaft to adjust the tension of the spring (for purposes as described above, and which will be more clear as the description progresses) and fixable in adjusted position by a set screw or the like, 68. Spring 63 sets at one end in a socket in the member 67, and at the other end in a socket in the cam 59.

In the form of governor as just described, that is in the tilting form, upon the speed of shaft 10 reaching a value where the centrifugal force is sufficient to overcome the trapped tension in spring 63, governor 61 turns on its pin 62, in a clockwise direction as viewed in Fig. 6, to move link 64 in the direction of the shaft 10, to tilt the cam 59 and progressively change the angle between the face of the cam and the center line of the shaft 10, to approach, as a limit, a position wherein the cam face is at, or close to, a right angle to the shaft. As will be explained below, this operates to govern the speed of the motor by progressively decreasing the periods of time during which contacts are closed, and progressively increasing the periods of time during which the contacts are open and the movable contacts are moving through the space between the front and back contacts.

Figure 8:
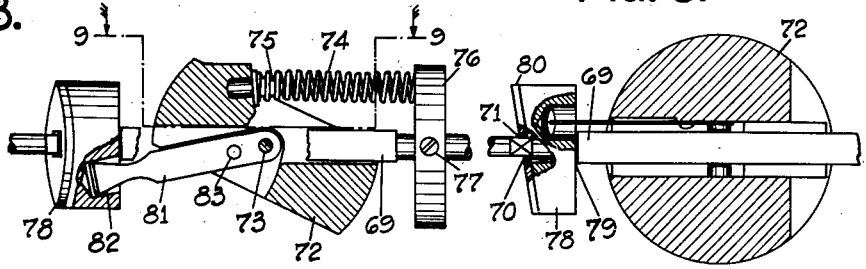
Fig. 8 is a plan view, with parts removed, and with parts shown in section and broken away, of the rotating type of cam governor.
Figure 9:
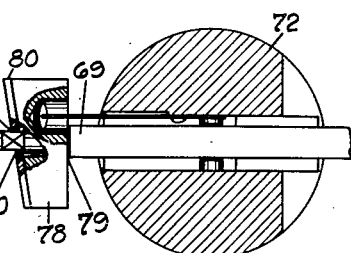
Fig. 9 is a sectional plan view, on line 9—9 of Fig. 8, viewed in the direction of the arrows.

Referring now to Figs. 8 and 9, there is here illustrated a third form of governor, wherein the contact controlling cam is rotated about the shaft under the influence of centrifugal force.

In this form, the shaft has a squared portion 69, with a reduced cylindrical portion 70, and a reduced squared portion 71, formed from the portion 70 by squaring it. Here again a centrifugal governor 72, formed of suitable material, such as brass or bronze, is pinned to the shaft at 73 so as to throw out from the shaft, about its pin 73, under the influence of centrifugal force. The governor is resiliently restrained from moving away from the shaft by a spring 74, having one end received on a pin 75 in the governor 72, and its other end received in a socket in an adjustable abutment member 76, slidable on the shaft and fixable in adjusted position by a set screw or the like, 77, whereby to adjust the initial tension of spring 74, for purposes as described above, and which will appear more clear as the description progresses.

A governing cam 78, formed of stainless steel or other suitable material, is received on the round part 70 of the shaft and bears against the shoulder 79 between the square portion 69, and the round portion 70 of the shaft, the cam being biased against the shoulder by the pressures of the movable contact pushers, as 42.

Carried on the reduced squared portion 71 of the shaft, is a flat thin plate 80, having a squared opening therein of dimensions slightly greater than the squared portion 71 of the shaft, whereby the plate can rock on the shaft, but is restrained from turning relatively thereto. An operating arm 81, has one end receivable in a socket 82 in the rear face of cam 78, with the other end received on the pin 73 which pivots the governor to the shaft. Inwardly of the pin 73, the arm 81 is connected to the governor 72 by means of a pin 83, whereby, upon the governor throwing out, away from the shaft, and against the tension of its spring 74, pin 83 will swing arm 81 about pin 73 as a pivot, to swing the outer end of arm 81 in an arc, and rotate cam 78 on the rotor shaft, to thereby change the relationship of the rotating field of the stator, with respect to the field of the rotor, and thereby change the drive torque and hence produce a governing effect, all as will appear more clear as the description progresses.

It can be seen from a consideration of the description just preceding, that regardless of the direction of rotation of the rotor shaft, the direction of rotation of the contact operating cam 78 will always be in the same direction. Hence, during governing operations with the motor running in one direction the governing movement of the cam will be in the same direction and hence be added thereto, while with the motor running in the other direction, the governing movement of the cam will be against the movement of the motor and will be subtracted therefrom. This difference in movement of the cam with respect to the pushers carried by the movable contacts would result in a difference in friction between the pushers and the cam, when the motor is running in different directions and hence would cause a difference in the governing action since the increased friction with one direction of motor operation would introduce an added load on the motor so that with other conditions fixed, the same constant speed would not be realized in a reversible motor. This defect in this type of governor, is overcome by means of the plate 80, which, it can be seen, is tiltable so as to always lie parallel with, and flat against, cam 78 and still not rotate relatively to the shaft, whereby to produce the same amount of friction between its outer face and the movable contact pushers, regardless of the direction of rotation of the motor. The friction between plate 89 and the cam 78, during governing movements of the cam, is, of course, the same in amount regardless of the direction of rotation of the motor, and hence the total friction is the same regardless of the direction of rotation of the motor, and accordingly the governing action is the same regardless of direction of motor operation.

For obtaining an understanding of the principles of operation of this motor, and of the various governing means employed, reference should be made to Figs. 10–22 of the drawings, and to the following explanation.

Figure 10:
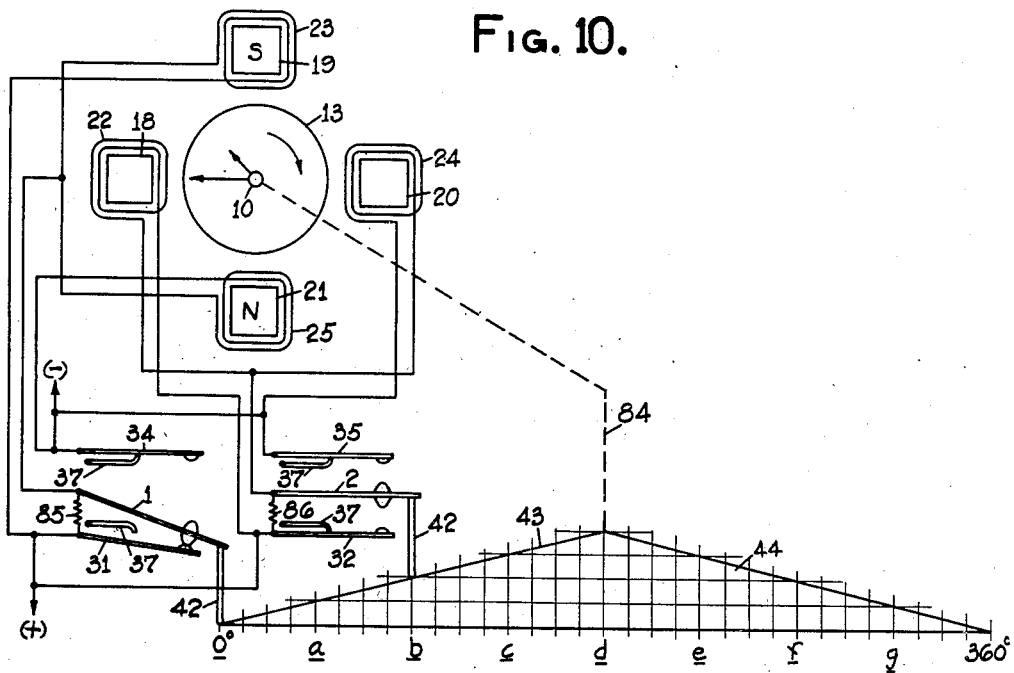
Fig. 10 is a schematic view of the motor, with contact spacing so chosen as to facilitate explanation of the principle of operation of the motor.

Referring first to Fig. 10, there is here represented, in a wholly schematic manner, a motor constructed in accordance with the above description. The four pole shoes 18—21, with their respective windings 22—25, are shown, together with the rotor disc 13, having its permanent magnetic field represented as in a given direction by the longer arrow, it being understood that the rotor could be electro-magnetically polarized if desired.

There is also represented here the contact arrangement, whereby movable contact fingers 1 and 2, cooperate with front contact fingers 34 and 35, and back contact fingers 31 and 32 respectively, all as described above. In this Fig. 10 is represented the cam 44 in its developed form, with contact face 43, and the shaft 10, represented by a dotted line 84, as being connected to the rotor and carrying the cam 44.

In order to protect the contact points from pitting and burning, and possibly sticking, resistances 85 and 86 are employed, and as shown, are bridged across movable contact finger 1 and cooperating back contact finger 31, and movable contact finger 2, and back contact finger 32, respectively. With this arrangement, it can be seen that each resistance is directly across one of the coils controlled by the movable contact in question, and is across the other coil so controlled, in series with the battery, which, in the figure in question, is represented merely by (+) and (−). More specifically, considering resistance 85, which is bridged across movable contact finger 1 and back contact finger 31, it can be seen that the voltage induced by the decay of flux produced by winding 23, can send current through the resistance 85 instead of across the contact fingers 1 and 34. Likewise, the induced voltage due to winding 25 being opened, can send current through the battery and the resistance 85 in series, instead of across contact fingers 1 and 31.

It is assumed in Fig. 10 that the rotor is turning clockwise, and that the developed cam 44 is moving from right to left and constantly in contact with the pushers 42, whereby to open and close each movable contact first on one of its fixed contacts, and then on the other, during a complete rotation of the shaft 10, which can be represented by the 360° of travel of the cam extending from 0° to 360°, as shown in the figure. With the parts as shown in Fig. 10, contact (1+) (that is, movable contact 1 is closed on the fixed contact 31 which is connected to positive battery), is made up with its maximum pressure, while movable contact 2 is midway between its front and back points and is moving toward making up (2−). In this schematic figure, for the purpose of simplifying the explanation of the motor, the principles of operation of the motor, the spacing of the contacts, and the slope of the cam, have been so chosen as to require a cam travel during the period when a movable contact is open, equal to the cam travel during each closed period of a movable contact. This produces, for each movable contact, a closure on its front point, then an open period, then a closure on its back point, and then an open period, each of 90° cam travel duration, with each movable contact opening at the same instant the other one closes, and vice versa.

Figure 11:
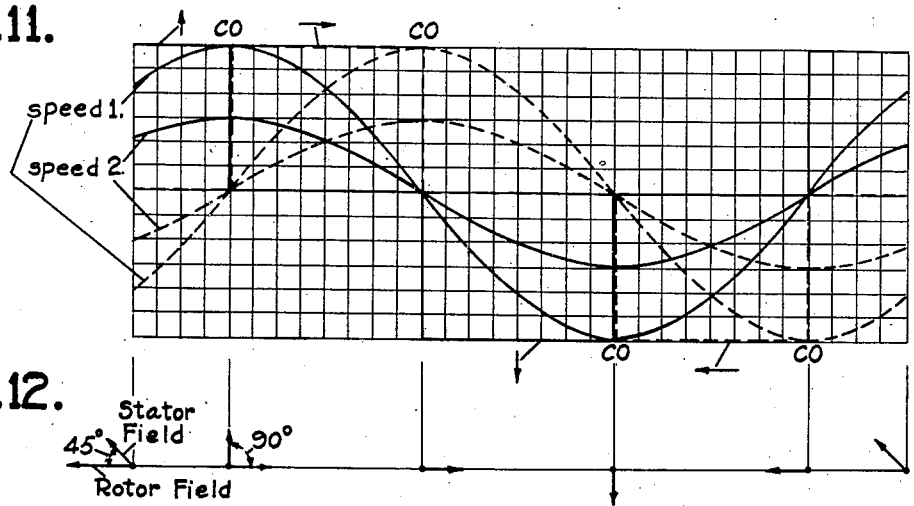
Fig. 11 is a diagrammatic representation of the individual fields produced in the stator of the motor of Fig. 10.

In Fig. 11 there has been represented the two fields, one produced by the operation of each movable contact, during a complete rotation of the shaft 10. In this figure there is shown a series of flat topped curves, merely for the purpose of a theoretical consideration of the operation, since such curves would not occur in practice, unless the rate of movement of the cam were infinitesimal, or the flux could build up to saturation point in an infinitesimal period of time, or both.

In the convention employed in Fig. 11, each curve represented by a solid line and above the base line, represents a field vertically upward, while the solid line representation below the base line represents a field vertically downward; each dotted line curve above the base line representing a field to the right, and the dotted line representation below the base line representing a field to the left. For facility in understanding of the following explanation, arrows have been attached to the curves, to indicate the directions of fields represented by these curves.

Considering Figs. 10 and 11, it can be seen that with contact 1 closed on (+), which will hereinafter be referred to as (1+), winding 23 is shunted out, and winding 25 produces a field vertically upward. As the cam moves to the left until the point a has reached the zero position; that is, after a cam movement of 45°, contact 1 opens, and contact 2 closes as (2−), to shunt out winding 24 and thereby produce a field to the right. The next 90° cam movement results in moving contact 1 through the open space between its fixed contacts, and first building contact pressure (2−) to a maximum and then decreasing it to a minimum.

The cam has now advanced to the point c and at this point contact 2 opens while contact 1 closes on (1−), to shunt out winding 25 and cause winding 23 to produce a field vertically downward. After a further cam movement of 90°, contact 2 closes on (2+), and contact 1 opens whereby to produce a field to the left. The next 90° of movement brings the cam around to the point g, and the starting condition, (not position) which is with a field vertically upward, due to contact 2 having just opened and contact 1 having just closed on (1+). This condition continues for 90° of travel to the point a.

Considering now what actually occurs during a rotation of the cam, upon the closure of a contact to shunt out one of the two bucking windings, and permit the other winding to be effective in producing a field, the flux builds up at a rate dependent upon the inductance of the circuit, and during this time the cam is traveling from the position where the contact was closed, toward the next contact control position. If the speed of the cam and the inductance of the circuits, are such that the field does not reach a saturation point before its contact is opened, the flat topped curves as represented in Fig. 11 will become peaked curves, with the peak occurring at the point of cam travel where the shunting contact opens, it being obvious that at the point where the contact opens is necessarily the peak of the curve.

The rotor, on starting from standstill, first moves slowly, and then rapidly gains speed and as it does so the time required for the cam to cover a given distance, such as a travel of 90°, progressively decreases and as a result the peaks of the resulting fields become lower and lower, but occur at the same point, namely, at the opening of a contact, to thereby give curves of the character shown in Fig. 11 and labeled "Speed 1," "Speed 2." It is clear that the higher the speed, the lower will become the corresponding curve, until, if there were no governing means, a speed would be ultimately reached at which the diminishing torque, due to the diminishing strength of field, is just sufficient to overcome whatever load may be on the motor (at least its own friction), at which speed the load and the drive torque are in balance and the speed will stay constant so long as conditions remain constant.

From the above considerations it can be seen that an increase of voltage would raise the peaks of the fields, and increase the torque and thus cause an increase in speed, while a decrease of voltage would have the reverse effect and decrease the speed. Also a decrease in load would increase the speed, and vice versa.

It should be understood that the vertical dotted lines and solid lines should be directly on top of each other, as for example, at the point $a$, but are shown slightly separated merely for the purpose of clearness in discussing the diagram. The small letters CO occurring at four places in Fig. 11, represent the points, such as $a$, $c$, etc., where a contact opens, and accordingly, where a peak occurs in the peaked curves, and where a flat topped curve drops toward the base line.

Figure 12:
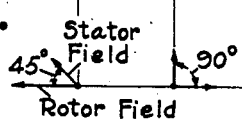
Fig. 12 is a diagrammatic representation of the directions of the resulting fields of Fig. 11.

Referring now to Fig. 12, there is here represented, by means of relatively short arrows, the direction of the resultant field in the stator at various points throughout the travel of the shaft through 360°. It can be seen in this figure, that when the cam has moved to position its point $a$ under the 0 point, the field is vertically upward; 90° further travel produces a field to the right; 90° further travel produces a field vertically downward, etc. From this it can be seen that the stator field is a field of substantially uniform strength, and, in the case of the peaked curves, rotates, in the particular example taken, in a clockwise direction, and at a uniform rate of speed.

Considering now the arrows under the point $a$, in Fig. 12, the field at this point, when there is a peaked curve of field flux, is 90° behind the field which just came into existence at this point with a theoretical flat topped curve, such field being represented by a dotted arrow under the point $a$. If the inductance of the circuits should be so small that after the closing of a contact, the flux value could reach a maximum before the contact opened, there would result a flat topped curve which would have a shorter and shorter flat portion as the speed of the rotor increased, until it would become peaked at the point where the contact opens. In this case the stator field, as the speed increased, would move backward toward the rotor field, to close up whatever angle existed between the two and would so continue to close up, until the curve of field flux becomes peaked.

Figure 13:
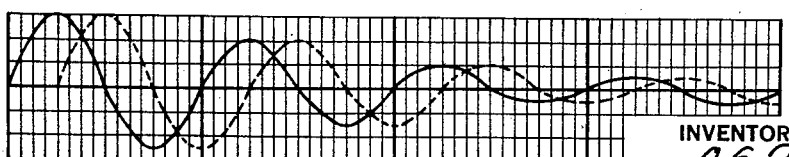
Fig. 13 is a diagrammatic representation of the individual stator fields as the motor starts up from standstill, and picks up speed, in the absence of any governing means.

In Fig. 13 is represented a series of curves showing broadly what very likely occurs as the motor starts from rest and picks up speed, it being noted that the peaks of the curves become lower and lower as the speed increases, since there is less and less time for the flux to build up, since the contacts are closed for a shorter and shorter time. Finally, it can be seen, the peaks are so low that the drive torque is just sufficient to carry whatever load is on the motor, and at this point the speed neither increases nor decreases so long as conditions remain constant.

It should be understood that the curves in Fig. 13 are merely diagrammatic, and that in practice there would be a constant change from one point to another, and the curves would not change abruptly from cycle to cycle, as represented in Fig. 13.

With the chosen spacing of contacts, and the slope of cam, as just discussed in connection with Fig. 10, etc., it can be seen that at the point where contact 1 opens, contact 2 closes, and if contact 1 should chance to open before contact 2 closes and the motor should stop at this point, it would not then be self-starting since no field would exist in the stator. This could be remedied by causing each contact to make before the other contact breaks, and also could be remedied by varying the contact spacing so that one contact will close some time before the other contact opened so as to have overlapping fields. Also, in the arrangement as in Fig. 10, the angle between the rotor field and the stator field is but 45° and this is in the most desirable angle of lead for maximum torque, and a larger spread would not be desirable, all as explained below, in considerable detail.

Figure 14:
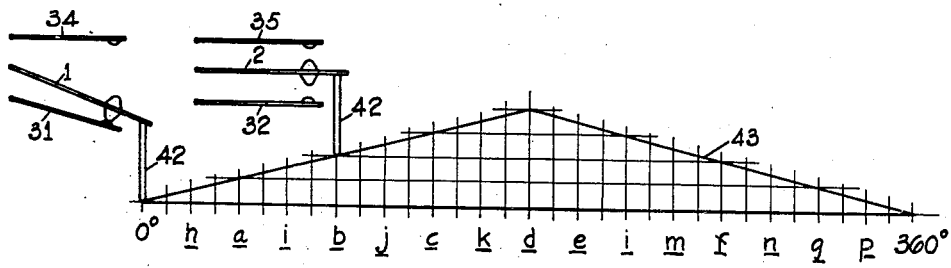
Fig. 14 is a fragmentary schematic view of the motor, with the contact spacing chosen to be that employed in one case in actual practice.
Figure 15:
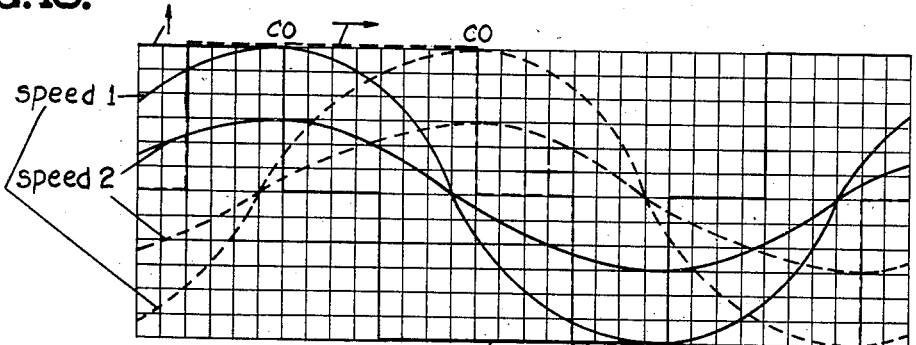
Fig. 15 is a diagrammatic representation of the individual fields produced in the stator of the motor of Fig. 14.

Considering now Figs. 14 and 15, there is here shown a different spacing of front and back contacts, whereby the closed contact periods are greater and the open contact periods are lesser, than in the case first considered. More specifically, with the arrangement as in Fig. 14, the angle of cam travel while a movable contact is moving from breaking one contact to making the other, is 45°, instead of 90° as in the previous case, and the closed period for each contact is 135°, instead of the previous 90°.

In the same manner as explained above, as the shaft rotates, and the cam passes under the movable contacts, these contacts open and close to produce fields as represented in Fig. 15. From this representation it can be seen that there is now an overlap of 45° of succeeding contact closures. For example, the field, or condition, represented by solid lines above the base line, continues for 45° after the field represented by dotted lines above the base line, has been initiated, the flat topped curves being considered here, since with the flat topped curves, each curve is coextensive with the period of contact closure.

It is to be noted in Fig. 15, that the theoretical flat topped curves are shown as in the previous case, and then the curves which very likely would actually occur are represented together with other curves labeled "speed 1," "speed 2." In the same manner as explained above, a rotating field is produced in the stator which decreases in strength as the speed increases, and this continues in the absence of a governor until the drive torque is just sufficient to carry the load, at which point the speed stays constant.

In representing the stator fields by smooth curves, in Fig. 15, it has been assumed that the field collapses at a somewhat faster rate than it builds up, it being seen that from a peak at the point $i$, the field becomes zero in a travel of what can be conveniently referred to as 7 squares, while it builds up to a peak in the other direction, under the point $m$, over a travel of 9 squares, thus causing a half-cycle to occur every 180°, as should be.

Figure 16:
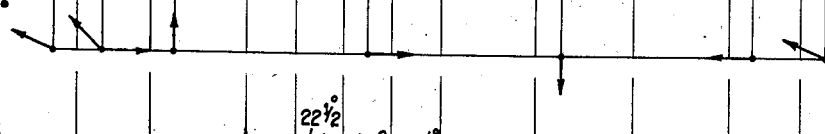
Fig. 16 is a diagrammatic representation of the directions of the resulting fields of Fig. 15.

Referring now to Fig. 16, there is here represented, by means of short arrows, the direction of the stator resultant field at various points throughout a complete rotation of the motor shaft. From this it can be seen that with a field vertically upward at the point midway between $a$ and $i$, the field has rotated 90° at the point midway between $c$ and $k$ and thus a field of substantially uniform intensity for any one speed of the motor, and rotating at a uniform rate, has been produced.

It can also be noted, from a consideration of the full line and dotted arrows at the point $h$, that there is a shift of the stator field in a direction backward toward the rotor, if the wave form should so change from a square top to a peak curve, of 135°.

At this point it might be well to consider the requirements for a motor which is to be self-starter equally well in either direction. It is clear, for equally good starting in either direction and for the motor to have the same speed characteristics in either direction, that at standstill the rotor field should be spaced 90° from the stator field. This is represented diagrammatically in Fig. 17 by the short arrow under the point b representing the stator field at this position of the cam and the long arrow under the same point b representing the rotor field at the same position of the cam. Thus, at standstill the stator field should have a lead of 90° from the rotor field in order to give self-starting characteristics as referred to just above.

Considering now what occurs as the motor starts from rest, it will be seen that the field existing at any one instant during the time it is in operation, is a field which is the resultant of one field which is building up and another field in a different direction which is decaying. Furthermore, at standstill there is no field which is decaying since this decaying field has totally collapsed. Accordingly, until the motor has turned a sufficient distance to change from the contact condition existing at standstill, to a different contact condition, there will be a stator field which, while it may change in strength, will be fixed in direction. Thus, the rotation of the rotor will cause the rotor field to catch up with the stator field to some extent. As soon as the rotor has moved from standstill, a sufficient distance to cause a change in contact conditions, the inductance of the circuits involved are such that even at the low speed of the rotor at starting, the rotor will be advancing, within a very short distance of travel, possibly half a revolution, at the same rate as the stator field is advancing, and hence will retain a lag with respect to the stator field which is constant in amount as the speed picks up.

Figure 17:
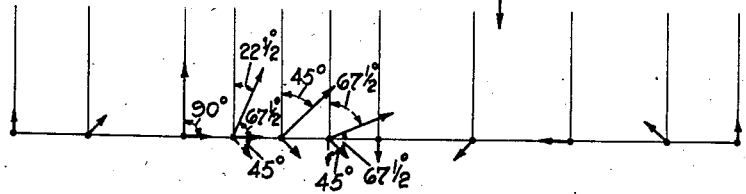
Fig. 17 is a diagrammatic representation of the directions of the resultant fields of Fig. 15, with respect to their relations to the rotor field, at standstill, and under operating conditions.

This may be somewhat more clearly understood from a consideration of Fig. 17. It can be seen, under the point b, that the stator field has a lead of 90° over the rotor field. It is obvious that on reversing the leads to the motor, the polarity of the stator field will be reversed, or shifted 180°, so that the motor will start equally well in either direction, from standstill.

Considering clockwise rotation, however, and referring to Fig. 17, it can be seen that the rotor can advance, in the particular case chosen, through an angle of 22½°, to the point j, before there is a change in contact condition such as will cause the stator field to start rotating. If the speed were slow enough, the stator field could shift from its horizontal direction to the right, a matter of 45° downwardly, as shown under j by the short dotted line arrow, while the rotor had moved substantially no distance at all. If this condition could exist, the stator field, after having shifted, would stay in this dotted line direction, under the point j, while the rotor moved 45° from its direction as shown under j, to thereby reach the position shown under k, where it will be noted the lead has been closed up to an angle of 67½° again, at which point, the stator field will start shifting to the position of the dotted line arrow under k.

From these considerations it can be noted that within a very short time from standstill, the rotor has attained such a speed with respect to the inductance of the circuits involved, that the rotor advances at substantially the same speed as the movement of the stator field and accordingly, the lead, in this particular case, about 67½°, between the two fields, is maintained. Of course, as the rotor speeds up there is less time for the fluxes to build up in the stator, and while the field retains a lead of 67½° and rotates with the rotor, the peaks of the waves become lower and lower to thereby produce a progressively weaker field and decrease the drive as explained above, this being on the assumption that there is no governor involved.

This lead of 67½° is variable, of course, as the construction varies, and may even vary with a fixed construction, and when referred to in the following discussion, is to be understood as only approximate.

Referring back to the contact arrangement as shown in Fig. 10, where a contact change occurs only upon 90° of cam movement, by starting from standstill under the point b, for example, Fig. 11, with the rotor field adjusted to be vertically upward, the rotor can travel 45° before it reaches the point c, at which point the stator field begins to rotate, due to a contact change. Accordingly, in this case, under operating conditions there would be a lead of 45° of the stator rotating field ahead of the rotor field, instead of the lead of 67½° which occurs in connection with the motor having a contact arrangement as illustrated in Fig. 14.

Figure 18:
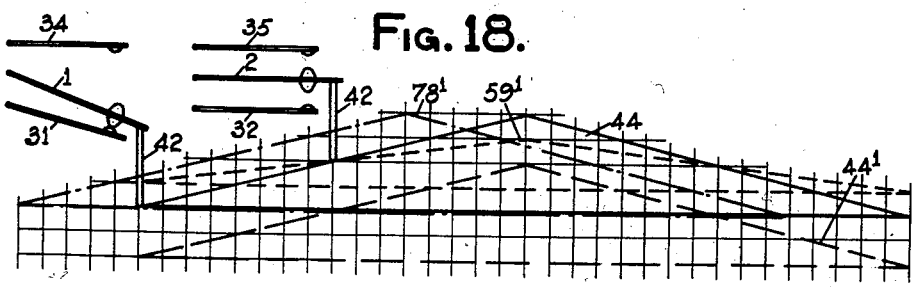
Fig. 18 is a diagrammatic representation of the governing cam, and of its various changed positions under influence of the various different governing means employed.

In Fig. 18 has been illustrated in a wholly diagrammatic manner, the movement of the control cam with reference to the movable contacts 1 and 2, under the influences of the three different forms of governing means described in detail above.

Starting with the cam in its initial biased position and before the centrifugal governor has moved away from the shaft, the cam is represented at 44 together with its relation to the movable contact fingers 1 and 2.

Under the influence of the governor the sliding form of cam moves from its initial position to the position 44¹, (dash line) or in other words, it slides along the shaft 10, to move the contacts 1 and 2 away from the front contact fingers 34 and 35, and toward the back contact fingers 31 and 32. Thus the back contacts are first progressively closed for a longer and longer time, and the front contacts a shorter and shorter time; then the front contacts are never closed, while the back contacts are opened for shorter and shorter periods of time until ultimately, as a limiting condition, the back contacts are closed throughout 360° of cam travel.

In the tilting form of cam, under the influence of the governor, the slope decreases while lowering the high point and raising the low point of the cam, to thereby assume a position such as 59¹, as indicated by dotted lines. From this it can be seen that the governing means operates to cause a greater and greater amount of travel of the movable contacts in open positions, and less in closed positions, until finally, as a limiting condition, the slope becomes so slight that the total movement of the movable contacts is not sufficient to close any contacts.

Considering how the form of governor wherein the cam is rotated on the shaft, upon the speed increasing, and the governor operating, the cam is turned on the shaft without changing its slope or axial position with respect to the contacts. This has been represented as cam 78¹, in dot and dash lines. In this form of governor, it can be seen that the angular relationship between the rotor field and the stator field has been changed in a manner to decrease the torque as the speed increases, as will be explained more fully below.

Taking up now the varying operation of the various governing means so far as it can be ascertained and understood at the present time, the rotatable governing means as shown in Figs. 8 and 9, will first be considered. This type of governing means is not the preferred form, but is considered first since the explanation of the various governing means would appear to be simplified thereby.

In this form of governor, as shown in Figs. 8 and 9, as the speed of rotation of the shaft increases, a point is reached when the centrifugal force is sufficient to overcome the force of the spring 74, and the centrifugal governor 72 turns on its pivot pin 73, away from the shaft 10 and turns the cam on the shaft. This results in shifting the position of the rotor field with respect to the stator field, and since these two fields in the absence of governor action are spaced about $67\frac{1}{2}°$, to give substantially maximum torque with a given field intensity, a movement in either direction away from this angle operates to decrease the torque at substantially the same rate. Accordingly, although the governor always causes the cam to rotate in the same direction, regardless of the direction in which the motor is running, the governing effect is substantially the same.

In the case of one direction of motor operation, the rotor field is shifted to cause the lead to be more than $67\frac{1}{2}°$, while with the motor running in the opposite direction the shift decreases the lead to less than $67\frac{1}{2}°$. Thus, at a given speed, the shift is of the same amount in either direction and the governing effect is substantially the same, and this has been borne out in practice in the case of an actual motor constructed and operated as described above.

Figure 20:
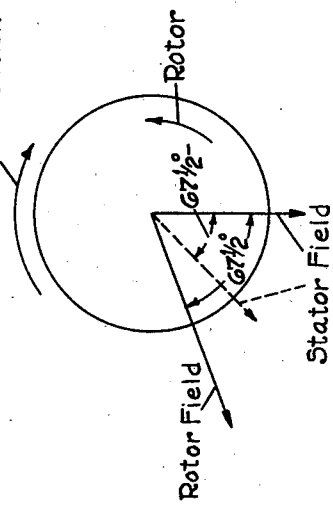
Figs. 19 and 20 are diagrammatic representations of the effect of the governing action of the rotatable cam, on the motor fields.
Figure 19:
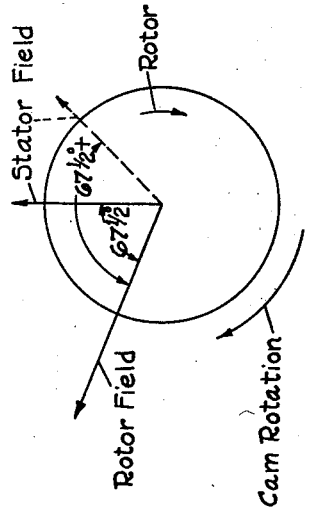

Considering the governing action somewhat more specifically, and referring to Figs. 19 and 20, and first to Fig. 19, if we consider the cam to be moved by the governor in a clockwise direction and that the motor is operating likewise in a clockwise direction, a given position of the stator field will occur sooner than if there had been no governing shift of the cam. Thus the stator field is shifted ahead, and the angle between the rotor, and stator fields is increased to be greater than $67\frac{1}{2}°$. In Fig. 19, the direction of the cam shift is indicated, and the direction of the rotor is indicated, both being in the same direction, and clockwise. There is also indicated by the longer solid line arrow, the rotor field, and by the shorter solid line arrow the stator field, with the angular relationship existing therebetween of $67\frac{1}{2}°$ lead, prior to any governing action. Upon the governor operating, the angle of lead is increased, as indicated by the new position assumed by the rotor field and indicated by the dotted line arrow, with the resulting angle of lead becoming $67\frac{1}{2}°+$.

Referring now to Fig. 20, the same conventions have been employed, but in this case the rotor is operating in a counter clockwise direction, that is, it is operating against the direction of rotation of the cam when the governor throws out from the shaft. In this case, the lead of $67\frac{1}{2}°$ is decreased an amount depending upon the speed, to become a lead of $67\frac{1}{2}°-$.

It can be seen from the above, that the rotatable form of governing cam operates in a like manner regardless of the direction of rotation of the motor, to govern the speed, and the above theoretical considerations have been borne out in practice. Accordingly, with the various parts as illustrated and described above, the angle of lead which gives substantially maximum torque is necessarily the $67\frac{1}{2}°$ which will exist during operation and before governing action, with the parts positioned at standstill as described above, that is, with the rotor field 90° behind the stator field, whereby to give similar self-starting characteristics for both normal and reverse operation of the motor.

Referring to Fig. 18, the manner in which the rotatable cam changes its position, is indicated by the dot and dash cam representation $78^1$, the slope and the lengthwise position of the cam on the shaft remaining unchanged, but the high point of the cam being shifted relatively to the movable contacts.

Coming now to the tilting form of governing cam, such as illustrated in Figs. 6 and 7, it can be seen that as the speed increases, the governor 61 rotates on its axis 62, to swing away from the shaft 10, whereby to lower the high point and raise the lower point of the cam, to gradually decrease the slope of the cam toward a position wherein the cam face is at right angles to the axis of the shaft. This can be readily seen from a consideration of Fig. 18, wherein the dotted line representation of cam 44 is indicated at $59^1$ as having considerably decreased its slope. If the speed should continue to increase the slope would continue to decrease until ultimately the slope would be insufficient to move the movable contacts, through one complete rotation of the cam, the distance between the front and back contacts, at which time no contacts would be closed at any time, and there would be no stator field and hence no drive torque whatsoever.

It can be appreciated that as the cam loses more and more of its slope, a greater portion of the cam movement in each rotation is required to move the movable contacts through the space between the front and back contacts and as a result a lesser distance of cam travel occurs during the time each contact is closed. In other words, each contact is closed later and opened earlier, and this increases as the cam flattens out more and more upon increased speed. Since the peak of the flux curve of the stator rotating field must occur at the point where a contact opens, and since the contact opens earlier, the rotating field will be shifted backward toward the stator field to thereby decrease the lead below $67\frac{1}{2}°$.

From the above considerations it can be seen that with this form of governing means, as the governor operates further and further, the curves representing the stator fields become shorter in duration when expressed as a percentage of a complete rotation of the shaft, and accordingly, the peaks become lower, and also the peaks are shifted to cause the fields to have a less advantageous lead with respect to the rotor field. As the cam continues to govern, a contact will be closed such a short time that the field which has built up will completely collapse before another field starts to build up and accordingly, during portions of the rotation of the shaft, there will occur places where no field exists, with these portions occurring between the ever shortening and lowering fields. Accordingly, the drive torque is decreased more and more and at the points where no field exists, there is no torque and so the rotor will coast and merely move under its own momentum, the action being first a drive and then no drive, and then a drive and then no drive, etc., with the coasting periods increasing in length until ultimately no field exists at all because no contacts are closed, and accordingly, no drive exists.

Figure 21:
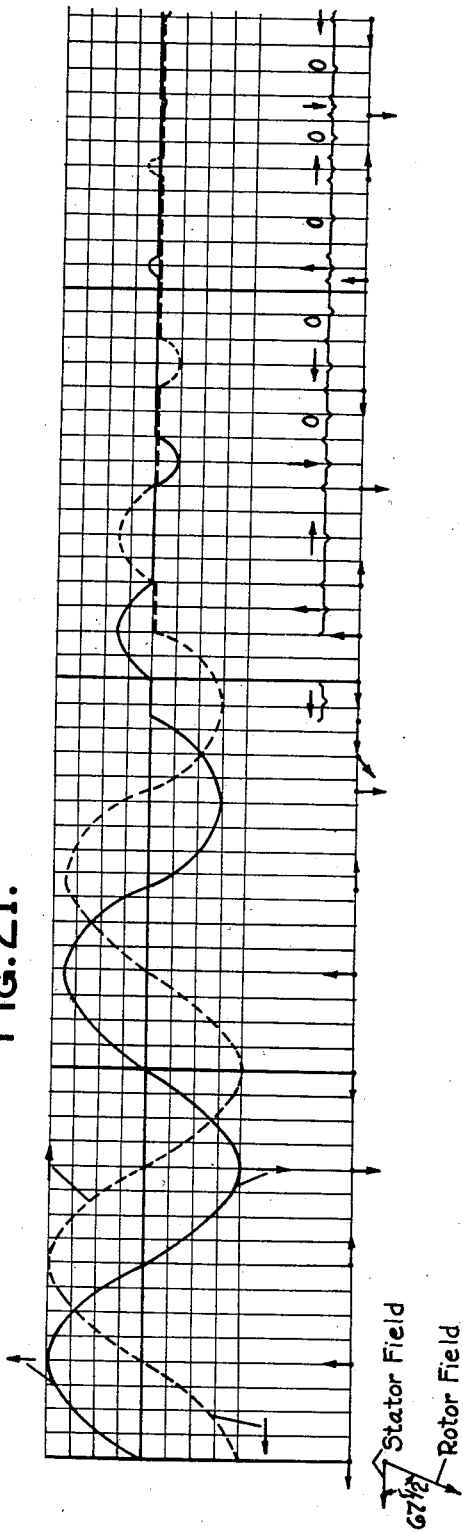
Fig. 21 is a diagrammatic representation of the effect of the governing action of the tilting cam, on the motor fields.

The governing action of this tilting form of cam is represented diagrammatically in Fig. 21, wherein an attempt has been made to show how the rotating stator field changes as the speed increases and the governing effect becomes greater and greater.

In Fig. 21 is represented the two stator fields, which approximate a sine curve at the beginning, and below this representation is a plurality of arrows indicating the direction of the resulting field at various points of the cycle, the arrow having its notch end starting at the point in the cycle where the indicated direction of field first exists.

With the above explanation, an inspection of Fig. 21 shows that the first cycle is represented without any governing effect superimposed thereon while for the succeeding several cycles, (slightly less than three) the governing effect is taking greater and greater hold. Keeping in mind that the peak of the curve must occur at the point of a contact opening and that in this form, as the speed increases, the contacts open earlier and earlier, the curves can be obtained by bringing the peaks closer and closer to the beginning of the cycle, as the speed increases.

From the curves represented in Fig. 21, it appears clear that the torque is decreased due to the loops becoming shorter and lower, and also due to the fact that the rotating field varies its rate of movement at different portions of each complete rotation, thereby changing the optimum lead of 67½°, to a less advantageous lead of something either greater or lesser than the optimum.

At first the loops merely become shorter and lower, then there are places where only one field exists whereby the resultant field does not rotate, and then places where neither of the two component fields exists, which means that there is no resultant and the rotor must coast under its own momentum. Finally, if the conditions are such that the speed continues to increase, the governor operates until the periods of no field overlap at which time all contacts are open and no drive torque remains.

Considering the portion of Fig. 21 involving the direction arrows, it can be seen that the first cycle represented, without governing action, presents a uniformly rotating stator field. In the second cycle, a uniformly rotating stator field occurs during three quarters of the cycle, while during the fourth quarter the field rotates twice its usual speed for half of the distance and then stays stationary for the remainder of this quarter cycle.

Considering the next cycle, it can be seen that the field rotates rapidly for one-half of the first quarter and then is stationary for the second half of this quarter, then jumps at the beginning of the second quarter and stays stationary during that quarter of a cycle, then jumps at the beginning of the third quarter cycle to stay stationary half of that quarter cycle and then to disappear for the remainder of that quarter cycle, and to do likewise for the last quarter cycle.

Considering the next cycle, it can be seen that for a short period of the first quarter cycle the field is vertically upward and for the remainder there is no field, for the second quarter cycle the field is to the right a still shorter proportion of the quarter cycle, with no field existing during the remaining portion of this quarter cycle, etc., until all of the stator field disappears if the governing action continues that far.

In the above consideration, it should be realized that the curves referred to are schematic representations of what is believed the governor cam produces in the motor, and that the actual operation may be somewhat different, although it cannot be ascertained at this time. Furthermore, it should be realized that the governing action would very likely proceed much more gradually than is indicated in these curves.

Referring now to the form of cam governor shown in detail in Figs. 4 and 5, as explained above, this type of cam slides along the shaft without changing its angular position or its slope, and hence upon sufficient increase in speed, it will move to assume various positions such, for example, as the dashed line representation of cam designated as $46^1$, in Fig. 18. The ultimate position of this type of cam, if the speed increases sufficiently, is that where it has moved backward away from the pushers, under the influence of the downwardly biased movable contact fingers 1 and 2, to such an extent that the movable contacts constantly make up on their back points, and the highest point of the cam is too low to open these back points throughout the complete rotation of the cam. In the ultimate position, with both back points closed, a steady field is produced which is in the center of the fourth quadrant, considering clockwise rotation. It can be seen from Figs. 14 and 15 that the two waves that are produced by the two back contacts being closed, are the solid line curve above the base line, and the dotted line curve below the base line, and that these produce fields respectively vertically upward, and horizontally to the left, the resultant of these two fields, of course, being at the center of the fourth quadrant, as stated above.

As the cam of this form slides on the shaft, the back points are closed during a longer and longer period of cam travel, and the front points are closed progressively shorter periods of cam travel, as the cam approaches the ultimate position. To state it somewhat differently, as the cam moves along the shaft, the front points close later and open earlier, while the back points close earlier and open later, and of course, the field becomes stronger when produced by the back points, since there is a greater amount of time for the field to build up to a higher point, and, conversely, the other fields become weaker.

As the cam moves along the shaft there will occur a period when the front points are not closed, while the back points are closed and opened, the cam during its rotation opening a back point and then causing the movable contacts to travel toward a front point, but before reaching such front point, the cam will cause a return travel towards the back point again.

In a manner similar to what is shown in Fig. 21, with regard to the tilting cam, there is shown in Fig. 22, a diagrammatic representation of what is understood to approximate the varying conditions of the stator field as the sliding cam is governed upon increasing speed.

Both in connection with this Fig. 22 and also Fig. 21, the representation is that of a motor with contacts spaced as in Figs. 14 and 15, that is, one in which the open contact travel is 45° and the closed contact travel is 135°.

In Fig. 22, for the sake of simplicity, it has been assumed that the flux builds up and decays at the same rate, while in Fig. 15 it was assumed that the flux decays at a somewhat faster rate than it builds up.

From the diagrammatic representation of Fig. 22, it can be seen that the upper solid line loops and the lower dotted line loops become higher and longer and the upper dotted line loops and the lower solid line loops become lower and shorter, for each cycle, as speed increases, whereby to give resulting curves as shown in Fig. 22. The representation below the series of curves, by means of short arrows, represent the direction of the resulting stator field at various points of each cycle, or, what is the same, at various points of each complete rotation of the motor shaft.

Considering the representation by short arrows, it can be seen that in the first cycle represented, wherein no governing action is considered to be taking effect, the stator field rotates at a uniform rate.

In the next cycle, the rotating field, in the third quarter of the cycle, which is in a north-east direction, collapses to zero and reverses to a south-west direction.

Considering the next complete cycle, it can be seen that starting from a west direction, the rotation is to a short distance beyond north and then back again to west, then towards the south a short distance and back again to the west.

During the next complete cycle, the rotation is substantially the same as just described except more time is spent in the fourth quadrant.

During the next complete cycle, the stator field does not leave the fourth quadrant at all, and spends most of its time at the halfway point of that quadrant.

Finally, considering the next two cycles, it can be seen that the stator field merely oscillates to one side and then to the other, of the central portion of the fourth quadrant, and gradually decreases its oscillation until it stays fixed at the central part of the fourth quadrant, or, as can be conveniently stated, in a north-west direction.

It should be remembered, that while the motor is increasing its speed, the rotor is moving at a substantially uniform rate throughout any short distance of travel and hence is moving at substantially uniform speed for any complete rotation of the shaft, and hence for any complete cycle of the rotating stator field. Since the stator field moves at various rates, staying longer in the fourth quadrant, at times reversing itself and being stronger in the fourth quadrant and weaker in the other quadrants and particularly weak in the second, the rotor moving at substantially constant speed over any short distance of travel is changing its angle of lag from the optimum one of substantially 67½°, and at times is even cutting past the field to thereby receive a drive torque in the direction the reverse of its movement.

Thus, in this form of governing means, the drive torque progressively decreases until, if the action continues far enough, there is a fixed stator field which acts as a brake on the rotor as it cuts through it. In practice, it has been found that this form of governor operates most satisfactorily, and maintains the speed practically constant over large variations of voltage, and load, or both. It is believed that in this form, the stationary stator field may occur, and that the rotor under such conditions cannot cut past this stationary stator field to any great amount but is, in effect, locked against movement away from this field whereby the stationary field occurring from time to time acts as a definite and sharp snubbing or braking device which locks the rotor to it and thus effects the governing action.

While motors in accordance with the above disclosures can be employed in various capacities and under various conditions, experiments carried on over a considerable period of time have shown that a motor constructed in accordance with this invention and governed by the sliding cam type of governor, operates over a voltage range of from 4 to 12 volts, to have a substantially constant speed of about 450 R. P. M., the variations from this speed being only two or three percent. The centrifugal governor can be variously adjusted, by adjusting the tension of the spring which holds it against the shaft to thereby realize various governing actions. In some cases, the spring is so adjusted that the centrifugal force does not become great enough to overcome the trapped tension in the spring, until after the speed has reached about 200 R. P. M. When the motor is running at its constant speed of about 450 R. P. M., the governor, both in the case of the sliding type of cam and also in the other two types, is positioned in some intermediate position between its two extreme positions. Under these conditions, an increase of speed due to increased voltage or decreased load, or to any other cause, causes the governor to throw out further from the shaft and thus decrease the drive torque. Conversely, upon a decrease of speed due to decreased voltage or increased load, or both, the governor moves inwardly toward the shaft to thus increase the drive torque.

It should be kept in mind that the above disclosure of several forms of this invention has been given merely for the purpose of explaining the construction and known operation of the motor, and has not attempted to give the exact proportions and adjustments which may be found to be most advantageous in practice, as time progresses. It is of course within the province of this invention to vary the contact spacing, the slope of the cam, the proportions of the centrifugal governor and the biasing springs employed, and the proportions of the rotor and the stator and magnetic structure and windings so as to vary the various electrical characteristics, so long as the essential features of the motor, as pointed out above, and the operating characteristics, as pointed out above, insofar as they are now understood, are not violated.

The above rather specific description of several forms which the present invention can assume, has been given solely for the purpose of example, and is not intended, in any manner whatsoever, in a limiting sense. It is to be understood that this application contemplates covering all such modifications and variations as may appear desirable, so long as they fall within the scope of the appended claims.

Having described my invention, I now claim:

1. In a direct current motor, in combination, a rotatable shaft, a rotor fixed to the shaft and magnetized in a given direction, a multi-polar stator having its poles distributed around the rotor, windings on the stator poles, contacts controlling the energization of the windings with direct current, and a control cam on the shaft positioned to operate the contacts as the shaft turns so as to produce a driving rotating field in the stator to react with the rotor field and cause the motor to operate.

2. In a direct current motor, in combination, a rotatable shaft, a disc shaped rotor fixed to the shaft and permanently magnetized in a given direction, a four pole stator having its poles distributed around the rotor in quadrature, a winding on each of the stator poles, contacts controlling the energization of the windings with direct current, and a control cam on the shaft positioned to operate the contacts as the shaft turns so as to produce a driving rotating field in the stator to react with the rotor field, the contacts being controlled so that at every position of the rotor there is a resultant stator field angularly spaced from the rotor field by a substantial angle, whereby to make the motor self-starting, and reversible.

3. In a direct current motor, in combination, a rotatable shaft, a disc shaped rotor fixed to the shaft and magnetized in a fixed direction, a stator including a magnetic yoke carrying four projectiong pole cores with their free ends positioned to inclose the rotor and spaced in quadrature, a winding on each pole core, a plurality of contacts for controlling the energization of the windings by direct current to cause each winding, in turn, to produce flux in its pole in the same direction with reference to the rotor, and a control member driven by the shaft and positioned to control the contacts.

4. In a direct current motor, in combination, a rotatable shaft, a disc shaped rotor fixed to the shaft and magnetized in a fixed direction, a stator including a magnetic yoke carrying four projecting pole cores with their free ends positioned to inclose the rotor and spaced in quadrature, a winding on each pole core, the windings on the two pairs of opposite cores being connected in series, a source of direct current connected across each pair of windings, a movable contact for each pair of windings movable to shunt out one or the other, or neither, of its windings, a pusher for operating each contact and extending substantially parallel with the shaft, and a control member on the shaft having a flat face tilted to the axis of the shaft and bearing against one end of each pusher, for controlling said movable contacts as the shaft turns, so that each contact shunts out first one and then the other of its windings with a period in between when neither is shunted out, the two windings of each pair being connected to produce opposing mmf.'s whereby to produce a driving rotating stator field.

5. In a direct current motor, in combination, a rotatable shaft, a disc shaped rotor fixed to the shaft and magnetized in a fixed direction, a stator including a magnetic yoke carrying four projecting pole cores with their free ends positioned to inclose the rotor and spaced in quadrature, a winding on each pole core, the windings on the two pairs of opposite cores being connected in series, a source of direct current connected across each pair of windings, a movable contact for each pair of windings movable to shunt out one or the other, or neither, of its windings, a pusher for operating each contact and extending substantially parallel with the shaft, a control means on the shaft having a flat face tilted to the axis of the shaft, and bearing against one end of each pusher, for controlling said movable contacts as the shaft turns, so that each contact shunts out first one and then the other of its windings with a period in between when neither is shunted, the two windings of each pair being connected to produce opposing mmf.'s, whereby to produce a driving rotating stator field, the two pushers being spaced on the control means face by an angle of substantially 90°, the contacts and control means being positioned so that each contact shunts one of its windings before the other contact opens the shunt across one of its windings.

6. In a direct current motor, in combination, a rotatable shaft, a rotor fixed to the shaft and magnetized in a fixed direction, a stator including a magnetic yoke carrying four projecting pole cores with their free ends positioned to inclose the rotor and spaced in quadrature, a winding on each core, the windings on the two pairs of opposite cores being connected in series, a source of direct current connected across each pair of windings, a movable contact for each pair of windings movable to shunt out either of its windings or neither of them, a control member on the shaft for controlling said movable contacts as the shaft turns so that each contact shunts out first one and then the other of its windings with a period in between when neither is shunted, the two windings of each pair being connected in opposition, whereby to produce a driving rotating stator field, and a contact saving resistance connected across each movable contact and one winding of its pair of windings.

7. In a direct current motor, in combination, a rotatable shaft, a rotor fixed to the shaft and magnetized in a given direction, a multi-polar stator having its poles distributed around the rotor, windings on the stator poles, contacts controlling the energization of the windings with direct current, a control means on the shaft positioned to operate the contacts as the shaft turns so as to produce a driving rotating field in the stator to react with the rotor field, a centrifugal governor responsive to turning of the shaft and movable to change the relationship of the control means to the contacts so as to progressively decrease the drive torque between the rotor and stator fields as the speed increases.

8. In a direct current motor, in combination, a rotatable shaft, a rotor fixed to the shaft and magnetized in a given direction, a multi-polar stator having its poles distributed around the rotor, windings on the stator poles, contacts controlling the energization of the windings with direct current, a control means on the shaft positioned to operate the contacts as the shaft turns so as to produce a driving rotating field in the stator to react with the rotor field, a centrifugal governor controlled by the shaft and movable to change the relationship of the control means to the contacts so as to decrease the drive torque between the rotor and stator fields as the speed increases, and adjustable elastic means opposing the governor movement under the influence of centrifugal force.

9. In a reversible direct current motor, in combination, a rotatable shaft, a magnetized rotor on the shaft, a multi-polar stator surrounding the rotor, energizing windings on the stator, a source of direct current, contacts controlling the energization of the windings from the direct current source, a control means on the shaft for operating the contacts to produce a rotating field in the stator, and a centrifugal governor responsive to rotation of the shaft to move the control means in a manner to reduce the drive torque of the stator field on the rotor by varying the phase angle between the two fields.

10. In a direct current motor, in combination, a rotatable shaft, a disc shaped rotor fixed to the shaft and magnetized in a fixed direction, a stator including a magnetic yoke carrying four projecting pole cores with their free ends positioned to inclose the rotor and spaced in quadrature, a winding on each pole core, the windings on the two pairs of opposite cores being connected in series, a source of direct current connected across each pair of windings, a movable contact for each pair of windings each movable to shunt out either of its windings or neither of them, a pusher for operating each contact and extending substantially parallel with the shaft, a control cam on the shaft having a flat face tilted to the longitudinal axis of the shaft and bearing against one end of each pusher for controlling said movable contacts as the shaft turns, so that each contact shunts out first one, and then the other, of its windings, with a period in between when neither is shunted, the two windings of each pair being connected to produce opposing mmf.'s, whereby to produce a driving rotating stator field, and a centrifugal governor controlled by the shaft and connected to cause the control cam to slide along the shaft to increase the duration of shunting of one winding of each pair, and decrease the duration of shunting of the other winding of each pair, whereby to approach the condition of a fixed stator field as the motor speed increases.

11. In a reversible direct current motor, in combination, a rotatable shaft, a magnetized rotor on the shaft, a multipolar stator surrounding the rotor, energizing windings on the stator, a source of direct current, contacts controlling the energization of the windings from the direct current source, a controller on the shaft for operating the contacts to produce a rotating field in the stator, a centrifugal governor responsive to rotation of the shaft, means connecting the governor to the controller to move the controller on the shaft, to cause the stator rotating field to rotate more and more slowly through one portion of its cycle of rotation to approach the condition of a stationary field as the speed of the shaft increases.

12. In a reversible direct current motor, in combination, a rotatable shaft, a magnetized rotor on the shaft, a multi-polar stator surrounding the rotor, energizing windings on the stator, a source of direct current, contacts controlling the energization of the windings from the direct current source, a controller on the shaft for operating the contacts to produce a rotating field in the stator, a centrifugal governor responsive to rotation of the shaft, means connecting the governor to the controller to slide the controller axially along the shaft while restrained against tilting or rotation on the shaft, to progressively make certain stator poles effective for a longer time, and others effective for a shorter time, in producing field flux, and thus cause the stator rotating field to rotate more and more slowly through one portion of its cycle of rotation, to approach a stationary field as the speed of the motor increases.

13. In a direct current motor, in combination, a rotatable shaft, a disc shaped rotor fixed to the shaft and magnetized in a fixed direction, a stator including a magnetic yoke carrying four projecting pole cores with their free ends positioned to inclose the rotor and spaced in quadrature, a winding on each core, the windings on the two pairs of opposite cores being connected in series, a source of direct current connected across each pair of windings, a movable contact for each pair of windings and each movable to shunt out either of its windings or neither of them, a pusher for operating each contact and extending substantially parallel with the shaft, a control means on the shaft having a face tilted to the axis of the shaft and bearing against one end of each pusher for controlling said movable contacts as the shaft turns so that each contact shunts out first one and then the other of its windings with a period in between when neither is shunted, the two windings of each pair being connected to oppose each other when energized, whereby to produce a driving rotating stator field, a centrifugal governor driven by the shaft and connected to tilt the control means so as to increase its angle to the shaft as the motor speed increases whereby to progressively decrease the duration of the shunting periods of all of the windings to the same extent and so decrease the drive torque as the speed of the shaft increases.

14. In a reversible direct current motor, in combination, a rotatable shaft, a magnetized rotor on the shaft, a multi-polar stator surrounding the rotor, energizing windings on the stator, a source of direct current, contacts controlling the energization of the windings from the direct current source, a control means on the shaft for operating the contacts to produce a rotating field in the stator, a centrifugal governor pinned to the shaft and operatively connected to the control means to respond to rotation of the shaft to move the control means so as to vary the control of the stator windings and make all of the windings progressively less effective to produce flux, to approach the condition where no field exists in the stator.

15. In a reversible direct current motor, in combination, a rotatable shaft, a magnetized rotor on the shaft, a multi-polar stator surrounding the rotor, energizing windings on the stator, a source of direct current, contacts controlling the energization of the windings from the direct current source, a control means on the shaft for operating the contacts to produce a rotating field in the stator, a governor pinned to the shaft, and movable outwardly from the shaft as the speed of the shaft increases, a flat face on the control means for operating the contacts, means pivoting the control means to the shaft, a connection between the governor and the control means, means biasing the control means to a position where its face is at an angle to the axis of the shaft, movement of the governor, upon increase of speed of the shaft, changing the tilt of the face of the control means to make all of the windings on the stator progressively less effective in producing flux, to approach a condition of no stator fields as the speed of rotation of the shaft increases.

16. In a direct curent motor, in combination, a rotatable shaft, a disc shaped rotor fixed to the shaft and magnetized in a fixed direction, a stator including a magnetic yoke carrying four projecting pole cores with their free ends positioned to inclose the rotor and spaced in quadrature, a winding on each core, the windings on the two pairs of opposite cores being connected in series, a source of direct current connected across each pair of windings, a movable contact for each pair of windings movable to shunt out either of its windings or neither of them, a pusher for operating each contact and extending substantially parallel with the shaft, a control member on the shaft having a flat face tilted to the longitudinal axis of the shaft and bearing against one end of each pusher for controlling said movable contacts as the shaft turns so that each contact shunts out first one, and then the other, of its windings, with a period in between when neither is shunted, the two windings of each pair being connected to produce opposing mmf.'s, whereby to produce a driving rotating stator field, and a centrifugal governor driven by the shaft and connected to rotate the control member on the shaft as the speed of rotation of the shaft increases, whereby to decrease the drive torque by changing the phase angle between the rotor and stator fields to a progressively less advantageous one.

17. In a reversible direct current motor, in combination, a rotatable shaft, a magnetized rotor on the shaft, a multi-polar stator surrounding the rotor, energizing windings on the stator, a source of direct current, contacts controlling the energization of the windings from the direct current source, a controller on the shaft with a flat face, against which the contacts bear and rub as the controller turns, for operating the contacts to produce a rotating field in the stator, a centrifugal governor responsive to rotation of the shaft and thereby reduce the drive torque of the stator field on the rotor by varying the phase angle between the two fields, the controller being moved by the governor always in the same direction regardless of the direction of operation of the motor, and means for equalizing the average friction between the contacts and the controller for forward and backward motor operation, whereby to give like speed characteristics regardless of the direction of operation of the motor.

18. In a reversible direct current motor, in combination, a rotatable shaft, a magnetized rotor on the shaft, a multi-polar stator surrounding the rotor, energizing windings on the stator, a source of direct current, contacts controlling the energization of the windings from the direct current source, a controller on the shaft with a flat face, against which the contacts bear and rub as the controller turns, for operating the contacts to produce a rotating field in the stator, a centrifugal governor responsive to rotation of the shaft to turn the controller on the shaft and thereby reduce the drive torque of the stator field on the rotor by varying the phase angle between the two fields, the controller being moved by the governor always in the same direction regardless of the direction of operation of the motor, and means comprising a flat plate, mounted on the shaft and positioned between the contacts and the controller face, restrained to rotate with the shaft but tiltable to always parallel the face of the controller, for equalizing the average friction between the contacts and the controller for forward and backward motor operation, whereby to give like speed characteristics regardless of the direction of operation of the motor.

OSCAR S. FIELD.